(12) United States Patent
Draper

(10) Patent No.: US 7,028,251 B2
(45) Date of Patent: Apr. 11, 2006

(54) SYSTEM AND METHOD FOR REDUCING THE SIZE OF DATA DIFFERENCE REPRESENTATIONS

(75) Inventor: Stephen P. W. Draper, Basingstore (GB)

(73) Assignee: IOra, Ltd., Hampshire (GB)

( * ) Notice: Subject to any disclaimer, the term of this patent is extended or adjusted under 35 U.S.C. 154(b) by 767 days.

(21) Appl. No.: 09/785,080

(22) Filed: Feb. 15, 2001

(65) Prior Publication Data

US 2003/0004990 A1    Jan. 2, 2003

Related U.S. Application Data

(60) Provisional application No. 60/198,259, filed on Mar. 2, 2000.

(51) Int. Cl.
*G06F 17/00* (2006.01)

(52) U.S. Cl. .................... 715/500.1; 715/500

(58) Field of Classification Search ............ 715/500.1, 715/511, 501.1, 500; 707/203; 709/219, 709/231

See application file for complete search history.

(56) References Cited

U.S. PATENT DOCUMENTS

| | | | |
|---|---|---|---|
| 5,001,628 A | 3/1991 | Johnson et al. |
| 5,008,814 A | 4/1991 | Mathur |
| 5,113,519 A | 5/1992 | Johnson et al. |
| 5,151,989 A | 9/1992 | Johnson et al. |
| 5,155,847 A | 10/1992 | Kirouac et al. |
| 5,212,789 A | 5/1993 | Rago |
| 5,276,871 A | 1/1994 | Howarth |
| 5,278,982 A | 1/1994 | Daniels et al. |
| 5,313,646 A | 5/1994 | Hendricks et al. |
| 5,317,728 A | 5/1994 | Tevis et al. |
| 5,325,524 A | 6/1994 | Black et al. |
| 5,347,653 A | 9/1994 | Flynn et al. |
| 5,355,476 A | 10/1994 | Fukumura |
| 5,377,326 A | 12/1994 | Murata et al. |
| 5,390,335 A | 2/1995 | Stephan et al. |
| 5,403,639 A | 4/1995 | Belsan et al. |

(Continued)

FOREIGN PATENT DOCUMENTS

EP    0 994 425    4/2000

(Continued)

OTHER PUBLICATIONS

Birrell, A., et al., "Grapevine: An Exercise in Distributed Computing," Apr. 1982, Communications of the ACM, vol. 25, No. 4, pp. 260-261.

(Continued)

*Primary Examiner*—Sanjiv Shah
(74) *Attorney, Agent, or Firm*—Meyertons, Hood, Kivlin, Kowert & Goetzel, P.C.; Eric B. Meyertons

(57) ABSTRACT

An improved system and method for reducing the size of data difference representations. The input data stream may be split into one or more output data streams such that the output data streams may be recombined and used to regenerate the original input data stream. Each of the output data streams may be independently differenced against the equivalent data stream from the previous version of the data. Non-localized changes in the input data stream may be converted into localized changes in a subset of the output data streams. The subset of output data streams no longer containing non-localized changes produce efficient (i.e., small) difference representations. The difference representations of each of these streams may be packaged into a single stream for transmission over a computer network. The receiving computer may reconstruct the multiplicity of difference representations, and recreate the multiplicity of translated data streams representing the updated data.

48 Claims, 13 Drawing Sheets

U.S. PATENT DOCUMENTS

| | | | |
|---|---|---|---|
| 5,418,957 A | 5/1995 | Narayan | |
| 5,434,994 A | 7/1995 | Shaheen et al. | |
| 5,546,539 A | 8/1996 | Poling | |
| 5,581,740 A | 12/1996 | Jones | |
| 5,644,782 A | 7/1997 | Yeates et al. | |
| 5,721,907 A | 2/1998 | Pyne | |
| 5,729,743 A | 3/1998 | Squibb | |
| 5,745,906 A | 4/1998 | Squibb | |
| 5,752,005 A | 5/1998 | Jones | |
| 5,754,774 A * | 5/1998 | Bittinger et al. | 709/203 |
| 5,757,669 A | 5/1998 | Christie et al. | |
| 5,778,395 A | 7/1998 | Whiting et al. | |
| 5,781,912 A | 7/1998 | Demers et al. | |
| 5,799,187 A | 8/1998 | McBrearty | |
| 5,806,075 A | 9/1998 | Jain et al. | |
| 5,813,017 A | 9/1998 | Morris | |
| 5,832,263 A | 11/1998 | Hansen et al. | |
| 5,850,565 A | 12/1998 | Wightman | |
| 5,859,971 A * | 1/1999 | Bittinger et al. | 709/203 |
| 5,878,434 A | 3/1999 | Draper et al. | |
| 5,978,805 A | 11/1999 | Carson | |
| 5,991,771 A | 11/1999 | Falls et al. | |
| 5,999,740 A | 12/1999 | Rowley | |
| 6,003,087 A * | 12/1999 | Housel et al. | 709/229 |
| 6,018,747 A | 1/2000 | Burns et al. | |
| 6,038,612 A | 3/2000 | Liow | |
| 6,101,507 A | 8/2000 | Cane et al. | |
| 6,128,652 A | 10/2000 | Toh et al. | |
| 6,233,589 B1 * | 5/2001 | Balcha et al. | 707/203 |
| 6,243,328 B1 | 6/2001 | Fenner et al. | |
| 6,269,370 B1 | 7/2001 | Kirsch | |
| 6,341,310 B1 | 1/2002 | Leshem et al. | |
| 6,411,952 B1 | 6/2002 | Bharat et al. | |
| 6,434,683 B1 * | 8/2002 | West et al. | 711/162 |
| 6,604,236 B1 | 8/2003 | Draper et al. | |
| 6,654,741 B1 | 11/2003 | Cohen et al. | |
| 6,665,342 B1 * | 12/2003 | Brown et al. | 375/240.16 |
| 6,665,658 B1 | 12/2003 | DaCosta et al. | |
| 6,665,837 B1 | 12/2003 | Dean et al. | |
| 6,704,722 B1 | 3/2004 | Wang Baldonado | |
| 6,718,350 B1 * | 4/2004 | Karbowski | 707/203 |
| 2002/0103823 A1 | 8/2002 | Jackson et al. | |
| 2004/0205587 A1 | 10/2004 | Draper | |
| 2005/0080823 A1 | 4/2005 | Collins | |

FOREIGN PATENT DOCUMENTS

| | | |
|---|---|---|
| JP | 04-0242829 | 8/1992 |
| JP | 05-091550 | 9/1993 |

OTHER PUBLICATIONS

Stonebraker, M., "Concurrency Control and Consistency of Multiple Copies of Data in Distributed INGRES," May 1979, IEEE Transactions on Software Engineering, vol. SE-5, No. 3, pp. 188-194.

Hazboun, K.A., et al., "A Multi-Group Technique for Data Compression," Jun., 1982, ACM SIGMOD Conference, pp. 284-292.

Spector, A. Z., "Performing Remote Operations Efficiently on a Local Computer Network," Apr. 1982, Communications of the ACM, vol. 25, No. 4, pp. 246-259.

Joseph, T. A., "Low Cost Management of Replicated Data in Fault-Tolerant Distributed Systems," Feb. 1986, ACM Transactions on Computer Systems, vol. 4, No. 1, pp. 54-70.

Lindsay, B., et al., "A Snapshot Differential refresh Algorithm," May 1986, ACM SIGMOD International Conference on Management of Data, pp. 53-60.

Black, A.P., Burris, C.H., Jr., "A Compact Representation for File Versions: A Preliminary Report," Feb. 1989, IEEE Conference on Data Engineering, pp. 321-329.

Gladney, H.M., "Data Replicas in Distributed Information Services," Mar. 1989, ACM Transactions on Database Systems, vol. 14, No. 1, pp. 75-97.

El Abbadi, A., Toueg, S., "Maintaining Availability in Partitioned Replicated Databases," Jun. 1989, ACM Transactions on Database Systems, vol. 14, No. 2, pp. 264-290.

Satyanarayanan, M., et al., "Coda: A Highly Available File System for a Distributed Workstation Environment," Apr. 1990, IEEE Transactions on Computers, vol. 39, No. 4, pp. 447-459.

Satyanarayanan, M., "Scalable, Secure, and Highly Available Distributed File Access," May 1990, IEEE Computer, vol. 23, No. 5, pp. 9-20.

Kistler, J., Satyanarayanan, M, "Disconnected Operation in the Coda File System," Oct. 1991, ACM Operating Systems Review, vol. 25, No. 5, pp. 213-225.

Liskov, B., et al., "A Replicated Unix File System (Extended Abstract)," Jan. 1991, ACM Operating Systems Review, vol. 25, No. 1, pp. 60-64.

Liskov, B., et al., "Replication in the Harp File System," Oct. 1991, ACM Operating Systems Review, vol. 25, No. 5, pp. 226-238.

Agrawal, D.,El Abbadi, A., "The Generalized Tree Quorum Protocol: An Efficient Approach for Managing Replicated Data," Dec. 1992, ACM Transactions on Database Systems, vol. 17, No. 4, pp. 689-717.

Alonso, R., Korth, H., "Database System Issues in Nomadic Computing," May 1993, Proc. Of the 1993 ACM SIGMOD International Conference on Management of Data, vol. 22, Issue 2, pp. 388-392.

Badrinath, B., "Impact of Mobility on Distributed Computations," Apr. 1993, ACM Operating Systems Review, vol. 27, No. 2, pp. 15-20.

Reddy, P., Bhalla, S., "A Non-blocking Transaction Data Flow Graph Based Approach For Replicated Data," Jul. 1993, ACM Operating Systems Review, vol. 27, No. 3, pp. 46-54.

Colton, M., "Replicated Data in a Distributed Environment," May 1993, Proc. Of the 1993 ACM SIGMOD International Conference on Management of Data, vol. 22, Issue 2, pp. 464-466.

Imielinski, T., Badrinath, B., "Data Management for Mobile Computing," Mar. 1993, SIGMOD Record, vol. 22, No. 1, pp. 34-39.

Satyanarayanan, M., et al., "Applications-Aware Adaptation for Mobile Computing," Jan. 95, ACM Operating Systems Review, vol. 29, No. 1, pp. 52-55.

Franky, M., "DGDBM: Programming Support for Distributed Transactions Over Replicated Files," Jul. 1995, ACM Operating Systems Review, vol. 29, No. 3, pp. 64-74.

Maffeis, S., et al., "A Generic Multicast Transport Service to Support Disconnected Operation," Apr. 1995, Proc. of the Second USENIX Symposium on Mobile and Location-Independent Computing, pp. 79-89.

Moore, K., "The Lotus Notes Storage System," May 1995, ACM SIGMOD Record, vol. 24, No. 2, pp. 427-428.

Huston, L., Honeyman, P., "Partially Connected Operation," Apr. 1995, Proc. of the Second USENIX Symposium on Mobile and Location-Independent Computing, pp. 91-97.

Montenegro, G., Drach, S., "System Isolation and Network Fast-Fail Capability in Solaris," Apr. 1995, Proc. of the Second USENIX Symposium on Mobile and Location-Independent Computing, pp. 67-78.

Allard, H., "Remote Access Can't Slow Down," Feb. 1996, Network World, vol. 13, No. 8, p. 53.

* cited by examiner

SYSTEM AND METHOD FOR REDUCING THE SIZE OF DATA DIFFERENCE REPRESENTATIONS

This application claims the benefit of Provision Application No. 60/198,259, filed Mar. 2, 2000.

BACKGROUND OF THE INVENTION

1. Field of the Invention

The present invention generally relates to systems and methods for representing the differences between collections of data stored on computer media. More particularly, the present invention relates to systems and methods for transmitting updates to such data using a representation of the differences between the updated version and a previous version or versions.

2. Description of the Related Art

The need to distribute large quantities of electronic information, typically via computer networks, arises in many applications involving geographically distributed computer users. In many such cases the information distributed must be maintained in an up-to-date state at the destination(s). An important goal in the distribution of these updates is to reduce the amount of data which must be sent in order to make the update.

In many cases reduction in the data size of the updates is achieved by means of some form of 'differencing'. In such methods the sending computer system calculates the differences between the version of the data which the receiving computer system already has and the updated version it is desired to distribute. A representation of these differences is then transmitted to the receiving computer system which uses it together with the previous version which it already has to construct the updated version of the data.

Many existing methods for producing a difference representation are known. Examples are the UNIX 'diff' utility, and iOra Limited's Epsilon Technology (U.S. patent application Ser. No. 09/476,723 filed on Dec. 30, 1999). However, the known methods have a tendency to produce large representations of the differences between one version and an updated version with many common forms of non-textual data. Specifically, data types in which differences tend not to be localized within the data generally produce large difference representations. Important cases of such data types include the following categories:

1) Executable files. Typically small changes made to computer source code (e.g., in small problem fixes) result in non-localized changes to the executable file(s) produced by building the source code. A major cause of this effect is that the insertion or modification of small regions of code or data variables will often cause unchanged data and sub-routines to be moved to different addresses throughout the executable. All references to such moved data or sub-routines then change throughout the executable file image. The effect of this can be considerable.
2) Compressed files. Many data types are typically represented in compressed form so that they take up less space on hard drives and require less time for transmission over computer networks. Small changes to the uncompressed content of such files may then cause large and non-localized changes to the compressed form. Important examples of these data types are the ZIP and CAB compression formats (often used in software distribution) and multimedia files such as images (e.g., GIFs and JPEGs, which are formats frequently used on web pages), sound files, or movies (e.g., MPEGs).

Accordingly, what is needed is a way to allow the efficient (in the sense that small difference representations are produced) differencing of data types in which non-localized changes are a feature.

SUMMARY OF THE INVENTION

The above limitations of previously known differencing methods are overcome by a system and method made in accordance with the principles of the present invention.

The method of the present invention includes the step of adding pre-processor elements which are applied to the data stream to be differenced prior to the use of one of the known differencing methods. These pre-processor elements may perform arbitrary translations upon the input data stream and split it into one or more separate output data streams subject to the constraint that said translated and split data streams can subsequently be recombined and (by addition of reverse translation) used to regenerate the original input data stream. This recombination and reverse translation is accomplished by post-processor elements matched to the pre-processor elements used (as depicted in FIGS. 7 and 10). In this manner the original input data stream comprising the updated version of the data to be differenced is split into a multiplicity of data streams. Each of this multiplicity of data streams may then be independently differenced (using any of the known differencing methods) against the equivalent data stream from the previous version of the data.

By judicious choice of translation and parsing based on the data type of the data being differenced the non-localized changes in the input data stream may be converted into localized changes in a subset of the output data streams. The net result of this is that the subset of output data streams no longer containing non-localized changes produce efficient (i.e., small) difference representations using the known differencing methods. In one embodiment, the difference representations of each of these streams are then packaged into a single stream or file for transmission over a computer network. The receiving computer then employs an unpackaging process to reconstruct the multiplicity of difference representations which (using the known method) are used to recreate the multiplicity of translated data streams representing the updated data (as depicted in FIG. 11). Using the post-processor elements described previously the receiving computer is then able to reconstruct the original updated data (as in FIG. 10).

The choice of appropriate pre (and therefore matching post) processor elements is dependent on the type of data being differenced. Specific examples of pre and post processing elements for use with executable files and with compressed files are described.

These and other benefits and advantages of the present invention shall become apparent from the detailed description of the invention presented below in conjunction with the figures accompanying the description.

BRIEF DESCRIPTION OF THE DRAWINGS

A better understanding of the present invention may be obtained when the following detailed description of the preferred embodiment is considered in conjunction with the following drawings, in which.

Figure 1:
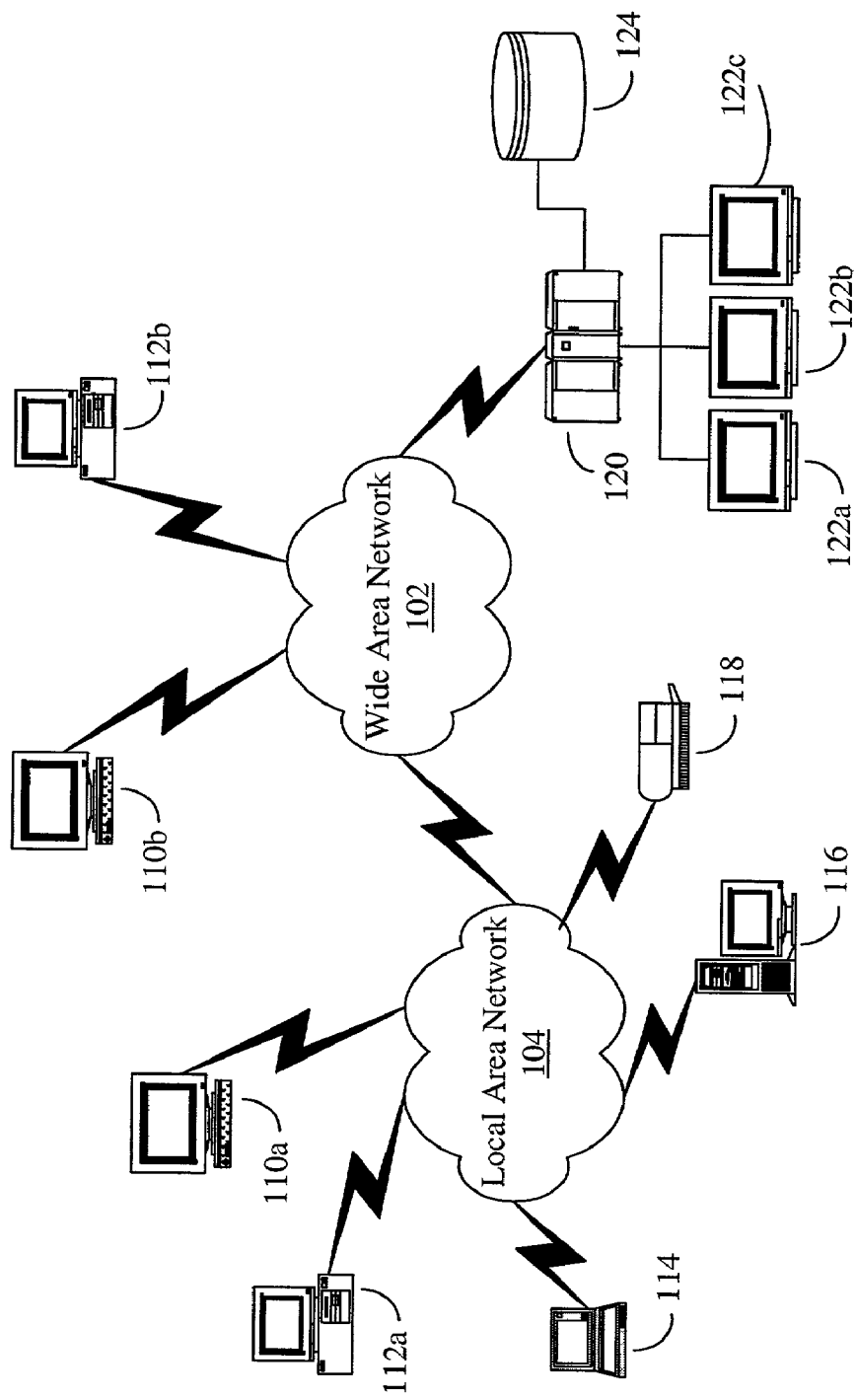
FIG. 1 is a network diagram of a wide area network which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1: Wide Area Network

FIG. 1 illustrates a wide area network (WAN) according to one embodiment. A WAN 102 is a network that spans a relatively large geographical area. The Internet is an example of a WAN 102. A WAN 102 typically includes a plurality of computer systems which are interconnected through one or more networks. Although one particular configuration is shown in FIG. 1, the WAN 102 may include a variety of heterogeneous computer systems and networks which are interconnected in a variety of ways and which run a variety of software applications.

One or more local area networks (LANs) 104 may be coupled to the WAN 102. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, and 116, and one printer 118. The LAN 104 may be coupled to other computer systems and/or other devices and/or other LANs 104 through the WAN 102.

One or more mainframe computer systems 120 may be coupled to the WAN 102. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

The WAN 102 may also include computer systems which are connected to the WAN 102 individually and not through a LAN 104: as illustrated, for purposes of example, a workstation 110b and a personal computer 112 b. For example, the WAN 102 may include computer systems which are geographically remote and connected to each other through the Internet.

Figure 2:
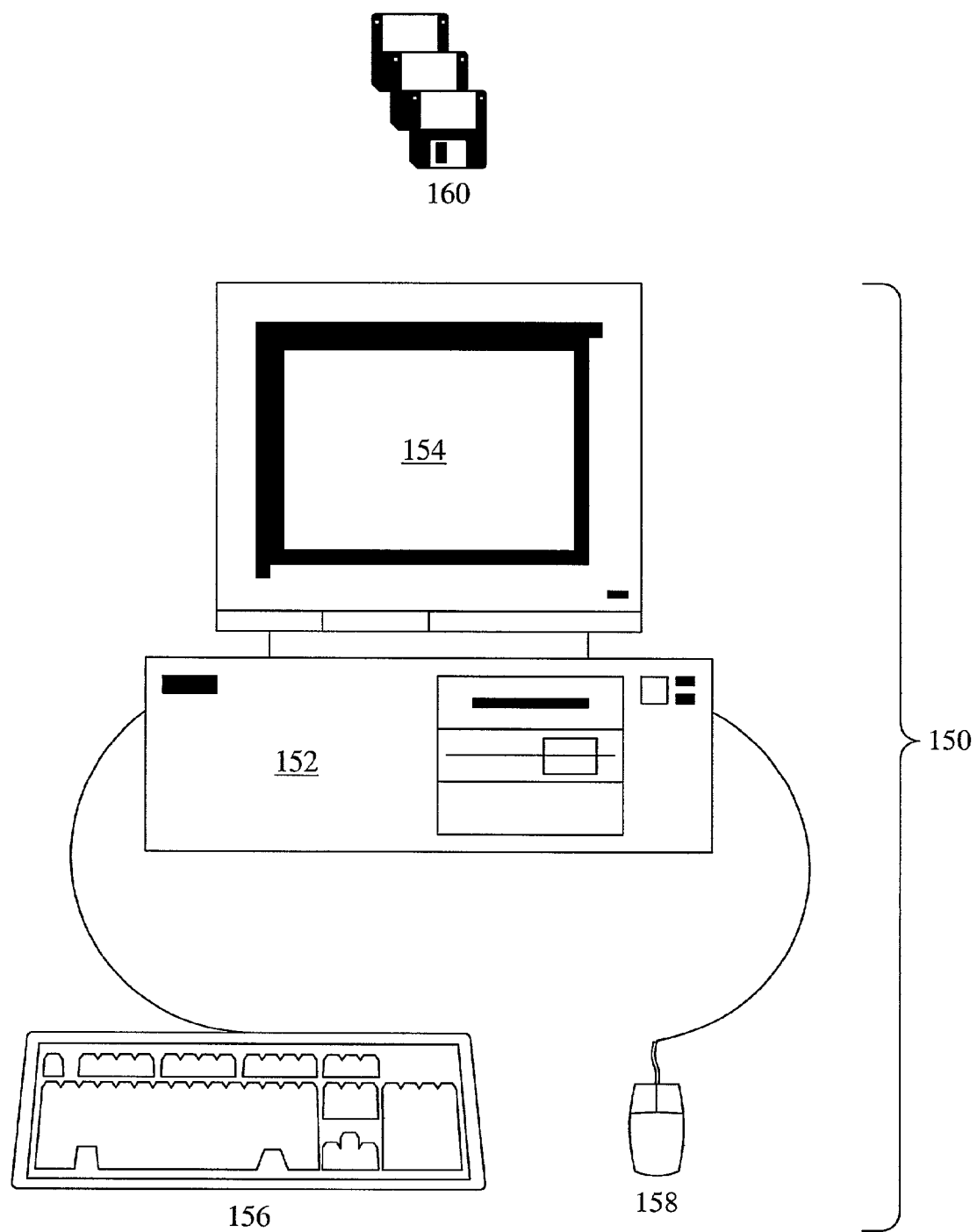
FIG. 2 is an illustration of a typical computer system which is suitable for implementing various embodiments.

FIG. 2: Typical Computer System

FIG. 2 illustrates a typical computer system 150 which is suitable for implementing various embodiments of a system and method for reducing the size of data difference representations. Each computer system 150 typically includes components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. The computer system 150 may be operable to execute the computer programs to implement reduction of the size of data difference representations as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 150 may take various forms, including a personal computer system, mainframe computer system, workstation, network appliance, Internet appliance, personal digital assistant (PDA), television system or other device. In general, the term "computer system" may be broadly defined to encompass any device having a processor which executes instructions from a memory medium.

The memory medium preferably stores a software program or programs for reducing the size of data difference representations as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

FIGS. 3A through 4C: Known Differencing Methods

In order to provide suitable terminology, known differencing methods are described in FIGS. 3A–3B and FIGS. 4A–4C. In general, known differencing methods fall into two broad categories: "present information differencing" and "stored information differencing". In present information differencing an updated version of the data (U) and a previous version of the data (P) are both present and accessible to the differencing process. In stored information differencing an updated version of the data (U) is available, together with stored summary information derived from a previous version of the data at some earlier time (P').

The UNIX utility "diff" is an example of a present information differencer. The Epsilon method (U.S. patent application Ser. No. 09/476,723 filed on Dec. 30, 1999) is an example of a stored information differencer. Typically, present information differencers are somewhat simpler but require both current versions and previous versions of the data to be held (precluding in-place updating and requiring up to twice the storage space as compared to stored information differencers). Stored information differencers, however, require a current version of the data and summary information derived from the previous version of the data to be kept. This summary information is typically much smaller than the previous version of the data itself.

As used herein a "generic differencer" refers to either a present information differencer or a stored information differencer, as appropriate. It is to be understood that what is meant by "previous version of the data" (i.e., P or P') is implied by the choice of known differencing method. That is, if the known differencing method used is the present information differencing method, then "previous version of the data" refers to the previous version of the data (P). Conversely, if the known differencing method used is the stored information differencing method, then "previous version of the data" refers to summary information derived from the previous version of the data (P').

Similarly, as used herein a "generic reconstructor" refers to either a present information reconstructor or a stored information reconstructor, as appropriate. It is to be understood that what is meant by "previous version of the data" (i.e., P or P') is implied by the choice of known reconstructing method. That is, if the known reconstructing method used is the present information reconstructing method, then "previous version of the data" refers to the previous version of the data (P). Conversely, if the known reconstructing method used is the stored information reconstructing method, then "previous version of the data" refers to summary information derived from the previous version of the data (P').

Note that a special case of a differencer is one that differences against NULL (i.e., the differences between an input data stream and nothing at all). Such a differencer may be referred to as a "NULL differencer". When a NULL differencer produces a difference representation smaller than the original input stream then it acts as a compressor. NULL differencers are considered to be included in the generic differencers enhanced by an embodiment of the present invention. Consequently the present invention may also be seen as a means for improving the efficiency of known compression methods.

Figure 3A:
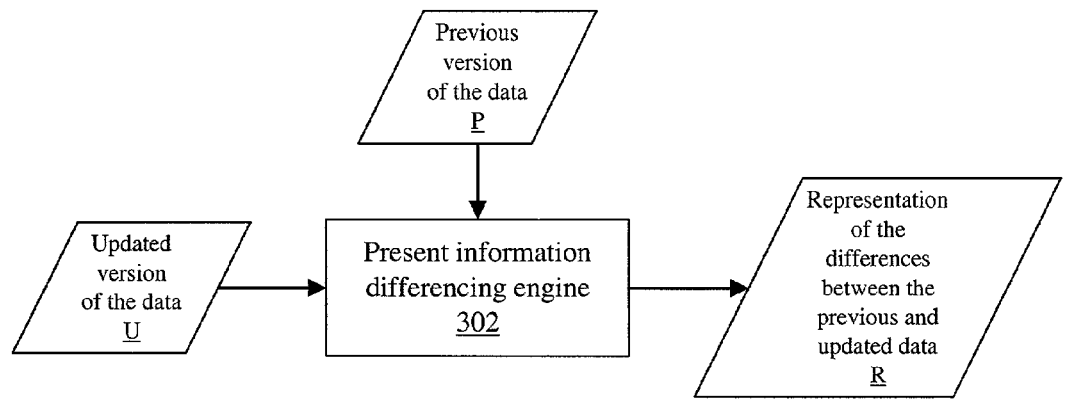
FIG. 3A is a block diagram illustrating a generic present information differencing engine which is suitable for implementing various embodiments.
Figure 3B:
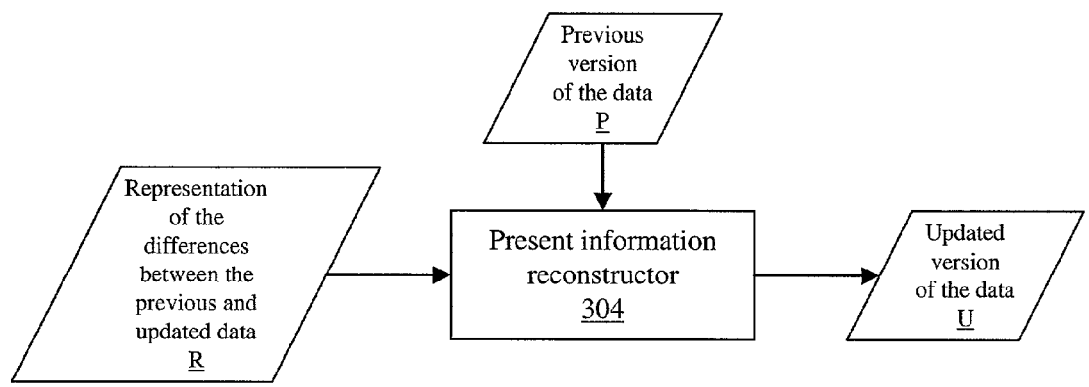
FIG. 3B is a block diagram illustrating a generic present information reconstructor which is suitable for implementing various embodiments.

FIGS. 3A and 3B: Generic Present Information Differencing Engine and Reconstructor FIGS. 3A and 3B are block diagrams of embodiments of a generic present information differencing engine, and a generic present information reconstructor, respectively.

In FIG. 3A, a present information differencing engine 302 compares an updated version of the data (U) and a previous version of the data (P) to construct a representation of the differences (R) between the previous version of the data (P) and the updated version of the data (U). In FIG. 3B, a present information reconstructor 304 may then reconstruct the updated version of the data (U) from the difference representation (R) and the previous version of the data (P). The present information differencing engine 302 and the present information reconstructor 304 are not illustrated as being connected as they typically are employed at different times, or deployed on different computer systems. The difference representation (R) is typically stored on computer storage media and/or transmitted over a computer network.

Figure 4A:
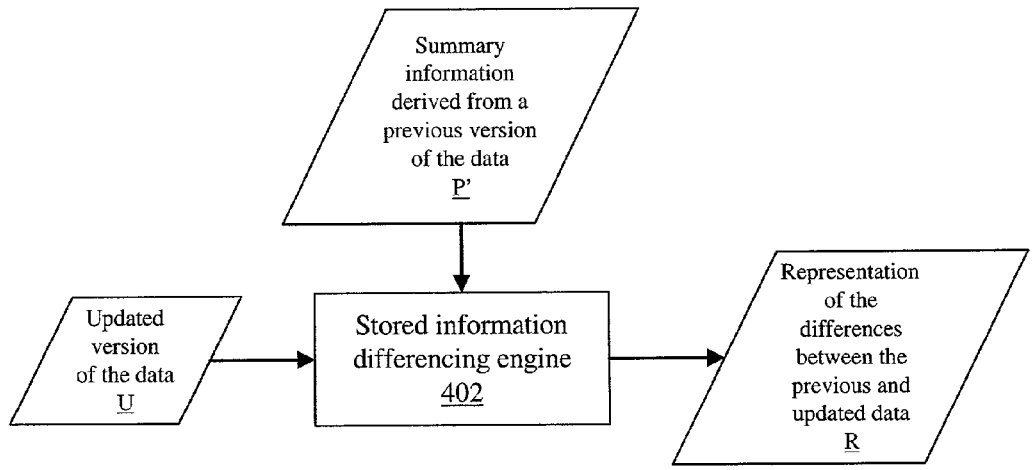
FIG. 4A is a block diagram illustrating a generic stored information differencing engine which is suitable for implementing various embodiments.
Figure 4B:
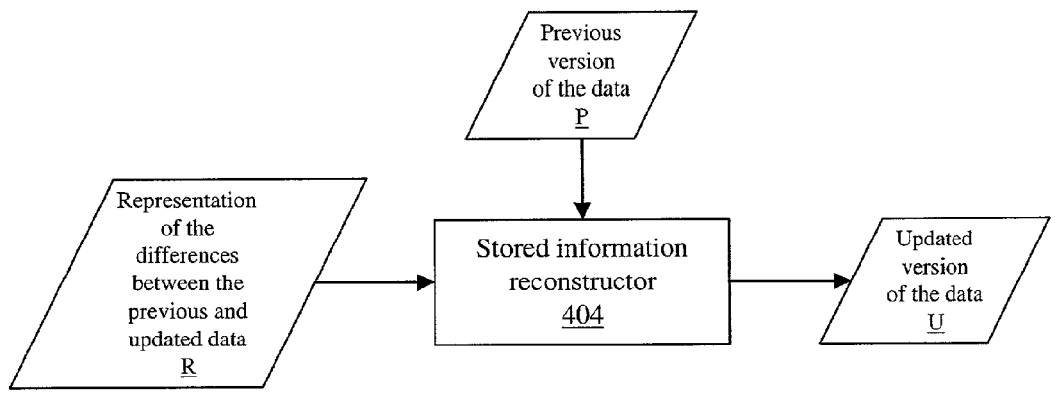
FIG. 4B is a block diagram illustrating a generic stored information reconstructor which is suitable for implementing various embodiments.
Figure 4C:
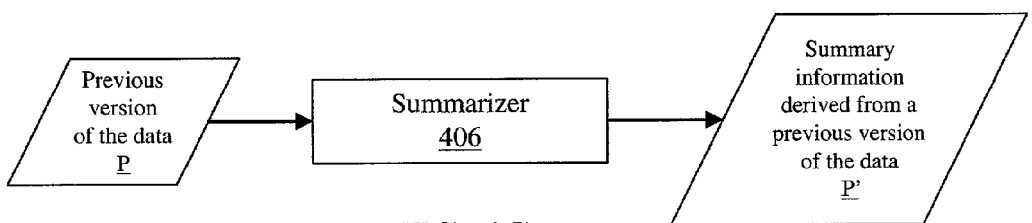
FIG. 4C is a block diagram illustrating a generic summarizer which is suitable for implementing various embodiments.

FIGS. 4A through 4C: Generic Stored Information Differencing Engine, Reconstructor, and Summarizer FIGS. 4A through 4C are block diagrams of embodiments of a generic stored information differencing engine, a generic stored information reconstructor, and a generic summarizer, respectively.

In FIG. 4A, a stored information differencing engine 402 may use the summary information derived from the previous version of the data (P') in conjunction with an updated version of the data (U) to construct a difference representation (R). In FIG. 4B, a stored information reconstructor 404 may then reconstruct the updated version of the data (U) from the difference representation (R) and the previous version of the data (P). In FIG. 4C, a summarizer 406 may use a previous version of the data (P) to construct summary information derived from the previous version of the data (P').

In most cases, the summarization performed in FIG. 4C will take place when the previous version of the data (P) is distributed. That is, typically, an updated version of the data (U) is used to construct summary information derived from the updated version of the data (U'), in the same way that the derivation of (P') is shown in FIG. 4C as derived from (P). Upon subsequent updates, the old (P') is discarded, the old (U') becomes the new (P'), and a new (U') is derived from the new (U).

Figure 5:
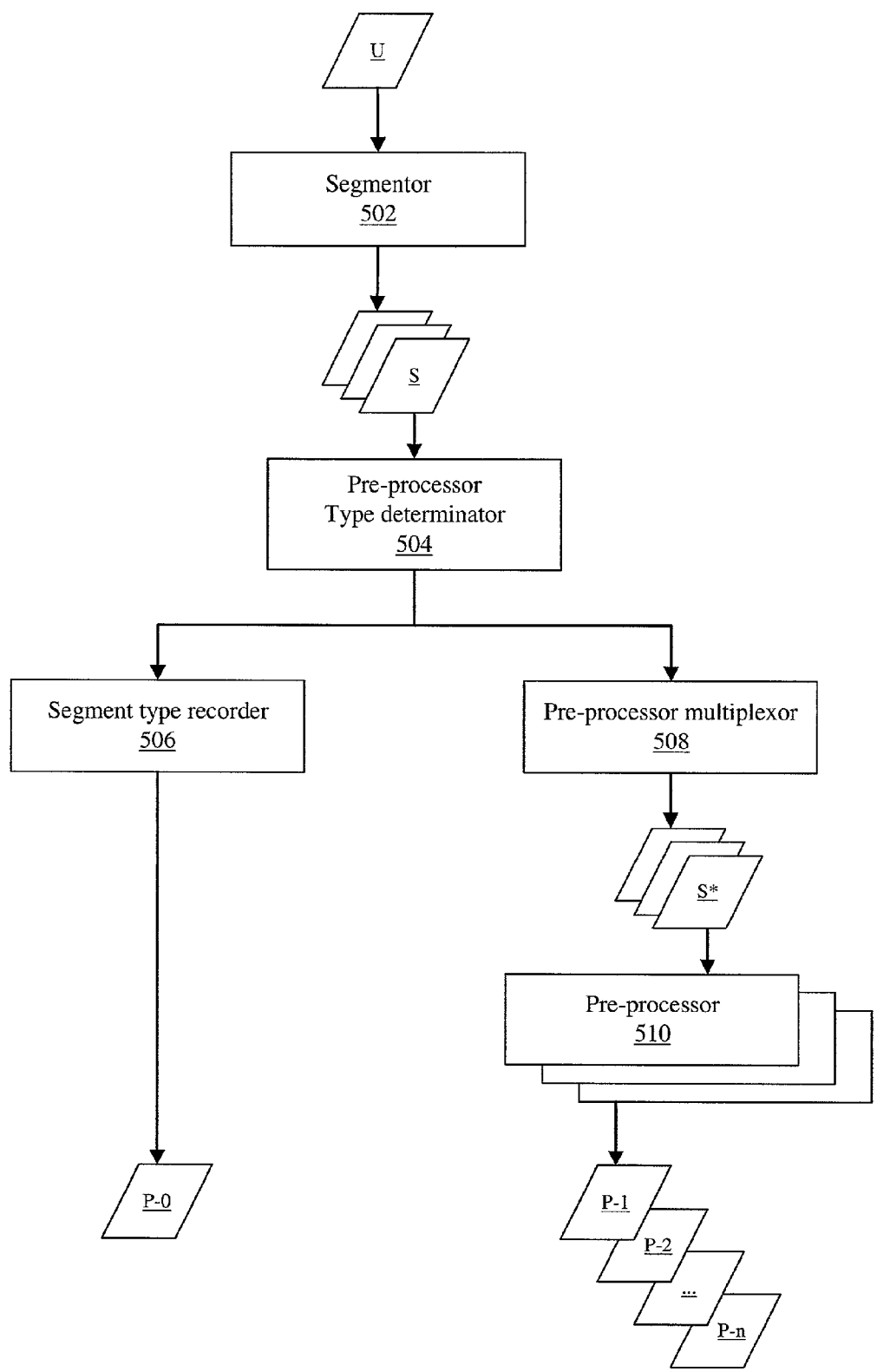
FIG. 5 is a block diagram illustrating an individual pre-processing step used to enhance the efficiency of existing differencing methods which is suitable for implementing various embodiments.

FIG. 5: Individual Pre-processing Step

FIG. 5 is a block diagram of an embodiment of an individual pre-processing step used to enhance the efficiency of existing differencing methods. This individual pre-processing step may include the process of converting data into a form in which changes are statistically more likely to be localized than is the case in the original form. As used herein, "form" refers to a structure or a format of data.

The original form of the updated version of the data (U) may be examined by a segmentor module 502. The updated version of the data (U) may also be referred to as an incoming data stream (U). The segmentor module 502 may then break the incoming data stream (U) into a sequence of substream segments (S) by communicating demarcation points (i.e., segmentation boundaries) to a pre-processor type determination module 504. Typically these segmentation boundaries will be chosen to represent logical demarcation points in the semantics of the incoming data stream (U). For example, if (U) represents the data from the files in a filesystem directory then a logical choice of demarcation point would be file boundaries. Each segment (S) may then be examined by the pre-processor type determination module 504. The pre-processor type determination module 504 may then use known methods to determine the type of data involved (e.g., a system in which the data is a Microsoft Windows file might determine type by examining the extension of the associated filename; alternatively, examination of a sample of the data may determine the type). Typically the actual instantiations of the segmentor module 502 and the preprocessor type determination module 504 for any particular embodiment will be mutually dependent and the segmentor module 502 will also communicate logical information about the segments (S) it identifies to the pre-processor type determination module 504 (e.g., names of the individual files represented by each segment). The pre-processor type determination module 504 may then assign a pre-processor module 510 to perform processing by instructing the pre-processor multiplexor 508 to route each segment (S) to a selected pre-processor module 510. In one embodiment, this selection of pre-processor module 510 may be based upon a simple table relating segment types to pre-processor modules in a deterministic fashion, the table may be constructed dynamically by a registration process in which additional pre-processor modules may be registered against segment types when the system is initialized. However, other selection mechanisms not featuring dynamic registration may also be used. The pre-processor type determination module 504 may also inform the segment type recorder 506 of the selections it has made. The segment type recorder 506 may then construct data stream ($P_0$) encoding the selection in a manner which allows the selection to be later determined by examination of data stream ($P_0$).

Based on the selection provided by the pre-processor type determination module 504, the pre-processor multiplexor 508 may route each segment of the incoming data (S) to a selected pre-processor module (i.e., one pre-processor module out of the many preprocessor modules diagrammed as 510). This data flow is labeled as S* (the * notation as used throughout these diagrams indicates that the data is an unchanged copy of the same flow without the *). Thus S* is simply a copy of S.

The selected pre-processor module 510 may then perform arbitrary reversible transformations and splittings on the data to construct one or more transformed data streams $P_1 \ldots P_n$ (n>=1). A constraint on this process may be that there exists a deterministic reverse process capable of taking $P_1 \ldots P_n$ and reconstructing (U) (see FIG. 8). In any given instantiation of this diagram, n may be a fixed integer, greater than or equal to 1 for all pre-processor modules that may be selected. This may ensure that, regardless of the selected module, n output streams may result, thus providing a fixed data interface for subsequent processing. Of course any individual pre-processor module may choose to utilize only a subset of these output streams (simply not producing any output on the other output streams).

Pre-processor Example #1: Database Record Parsing:

Suppose that the original form of the input data (U) is a database table representing goods and prices, and that the database table is represented in the data stream in row-major order. That is, the database table consists of a sequence of the form:

GOODS DETAILS #1, PRICE #1, RECORD SEPARATOR

GOODS DETAILS #2, PRICE #2, RECORD SEPARATOR

. . .

GOODS DETAILS #n, PRICE #n, RECORD SEPARATOR

An appropriate choice of parser for this data type may be one which parses the data into two streams representing the two fields of the records. Thus $P_1$ would be the sequence:

GOODS DETAILS #1, RECORD SEPARATOR

GOODS DETAILS #2, RECORD SEPARATOR

. . .

GOODS DETAILS #n, RECORD SEPARATOR and $P_2$ the sequence:

PRICE #1, RECORD SEPARATOR

PRICE #2, RECORD SEPARATOR

. . .

PRICE #n, RECORD SEPARATOR

As a common update to this database may be price changes, (i.e., price is statistically likely to be more volatile than description for this example) it follows that such changes are localized to the data in stream $P_2$, with $P_1$ being unchanged. With known differencing methods being applied to each of $P_1$ and $P_2$ separately, the size of the sum of the resulting difference representations may be significantly less than the size of the difference representation obtained by applying the same known differencing method to the original form of the input data (U).

Pre-processor Example #2: Decompression of Compressed Data:

Suppose the input data flow (U) is the content of a compressed file using the well known ZIP data compression format frequently encountered on personal computer systems. An appropriate choice of pre-processor for ZIP format data is a ZIP decompressor which takes the compressed file and transforms it into the uncompressed data it represents. To see why this achieves the goal of transforming non-localized changes into localized changes consider the case of a ZIP file containing a collection of text files. Suppose now that the updated version of the ZIP file contains the same text files, one of which has been modified. Because of the effects of compression this modification causes rippling changes to the entire compressed ZIP file, resulting in most of the compressed data changing relative to the original version. However, when an appropriate pre-processor is applied, the changes within the data may be localized to the single changed file, and furthermore only to a region of the single changed file. Such a data stream (with its localized changes) may then provide greatly enhanced differencing performance. One embodiment of a pre-processing method for use with executable content is described in FIG. 12.

In one embodiment, an identity-pre-processor (i.e., a pre-processor which simply constructs one output stream identical to its input: $P_1$ being the only output and being a copy of S*) may be included in the set of selectable pre-processor modules 510. The identity-pre-processor would typically be used when no specific pre-processor mapping is registered for the determined data type.

Multiple pre-processor modules 510 may be combined to construct a single logical composite pre-processor module. Modules may also be referred to as steps or stages. Typically a single logical composite pre-processor module is useful where multiple encoding techniques are involved with the data to be differenced. Such cases occur frequently and a simple example would be a compressed executable file. Such a file would benefit from the use of pre-processor steps both to decompress the file and to identify logically unchanged patterns in the instruction stream. This process is abstractly illustrated in FIG. 6.

Figure 6:
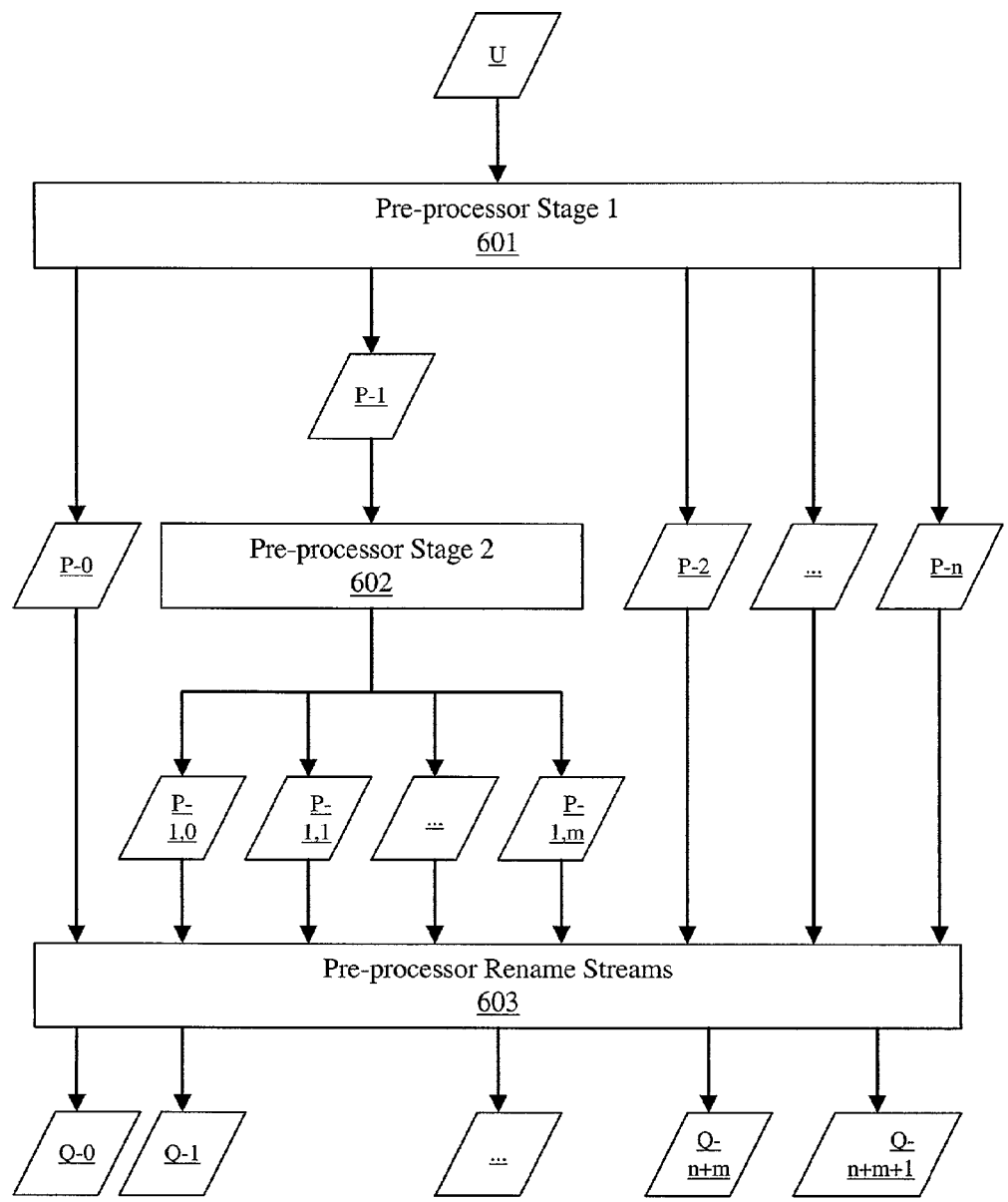
FIG. 6 is a block diagram illustrating multiple pre-processing steps which may be combined to form a single composite pre-processing step of the same general form which is suitable for implementing various embodiments.

FIG. 6: Composite Pre-processing Step

FIG. 6 is a block diagram of an embodiment of a composite pre-processing step. The composite pre-processing step in this example is made up of three stages: a pre-processor stage 1 (601), a pre-processor stage 2 (602), and a pre-processor rename streams stage (603).

The original form of the updated version of the data (U) may be processed by the pre-processor stage 1 (601), resulting in transformed data streams $P_0 \ldots P_n$. The pre-processor stage 2 (602) is shown as acting upon transformed data stream $P_1$ only. It is noted that the pre-processor stage 2 (602) may just as easily act upon any or all of the transformed data streams $P_0 \ldots P_n$ output from the pre-processor stage 1 (601). Additional pre-processor stages (i.e., a pre-processor stage 3, a pre-processor stage 4, etc.) may also be added in any instantiation or embodiment. Each additional pre-processor stage may act upon any or all of the transformed data streams of previous pre-processor stages. Similarly, further stages may be composited onto the resulting combined stage to an arbitrary degree. For any given instantiation the composition architecture (i.e., the number of stages on any given path) will normally be fixed. Consequently the number and semantics of the output streams may be fixed and deterministic for any given implementation. The processing performed by the pre-processor stage 2 (602) upon transformed data stream $P_1$ may result in transformed data streams $P_{1,0} \ldots P_{1,m}$. The input to the pre-processor rename streams stage (603) may be transformed data streams $P_0, P_2 \ldots P_n$, directly from the pre-processor stage 1 (601), along with transformed data streams $P_{1,0} \ldots P_{1,m}$, directly from the pre-processor stage 2 (602). It is noted that transformed data stream $P_1$ is not an input to the pre-processor rename streams stage (603). The output of the pre-processor rename streams stage (603) may be transformed data streams $Q_0 \ldots Q_{n+m+1}$.

Figure 7:
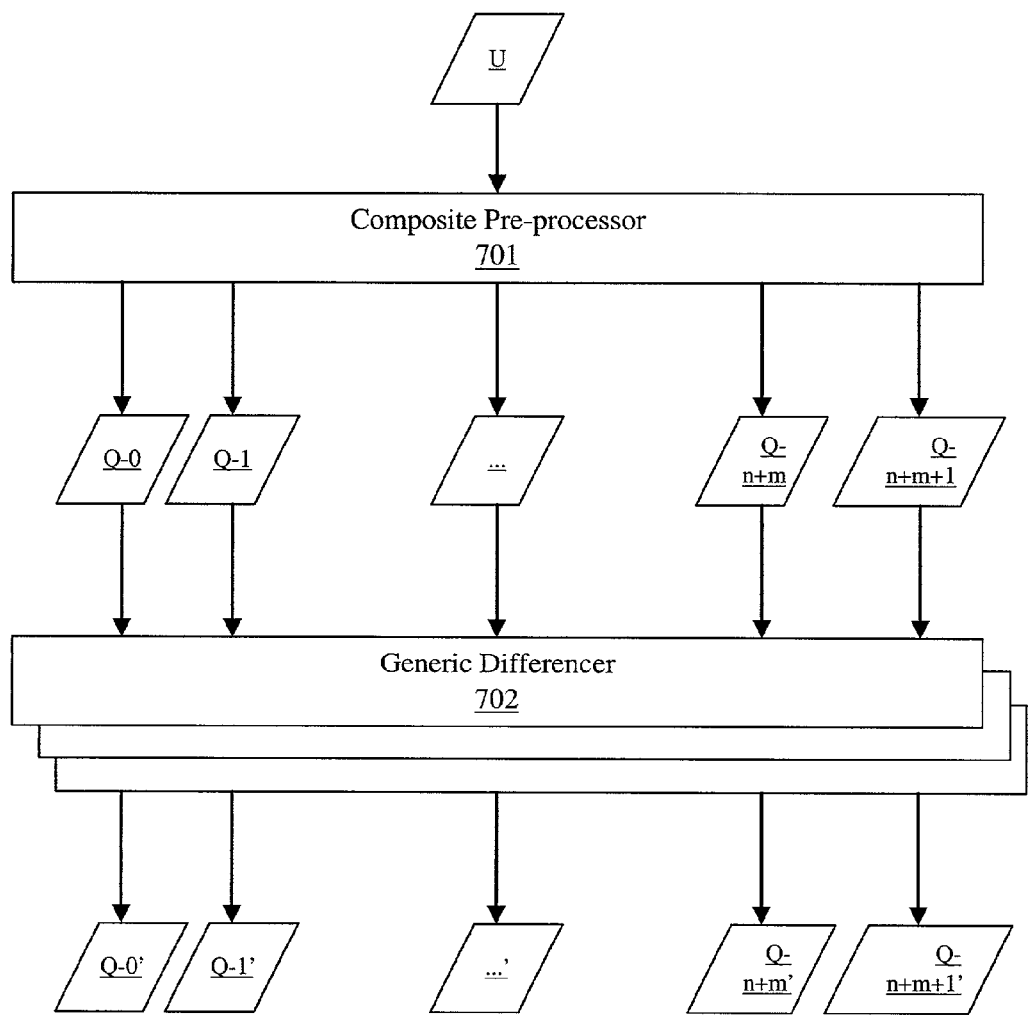
FIG. 7 is a block diagram illustrating a combined pre-processing step used in conjunction with known differencing methods to produce an enhanced differencer which is suitable for implementing various embodiments.

FIG. 7: Enhanced Differencer

FIG. 7 is a block diagram of an embodiment of a composite pre-processing step (i.e., as described in FIG. 6) combined with generic differencers for the purpose of constructing an enhanced differencer. The composite pre-processing steps of FIG. 6 are noted as one step in this example: a composite pre-processor 701.

The original form of the updated version of the data (U) may be processed by the composite pre-processor 701, resulting in transformed data streams $Q_0 \ldots Q_{n+m+1}$. Each output stream $Q_0 \ldots Q_{n+m+1}$ may then be subject to differencing using any known generic differencing method 702, resulting in transformed data streams $Q_0' \ldots Q_{n+m+1}'$. As discussed earlier, the known generic differencing method 702 may compare the previous version of each data stream with the current output streams $Q_0 \ldots Q_{n+m+1}$. It is noted that it is not necessary to use the same known generic differencing method 702 on each output data stream $Q_i$ provided that there is a deterministic mapping of differencing method to output data stream (to allow reassembling as described in FIG. 10). Typical embodiments may use an identity differencer in box 702 upon output data stream $Q_0$ along with other differencers upon the other output data streams. The identity differencer ignores the previous version of the data entirely and simply outputs the updated data in full, such that $Q_i'=Q_i$.

Figure 8:
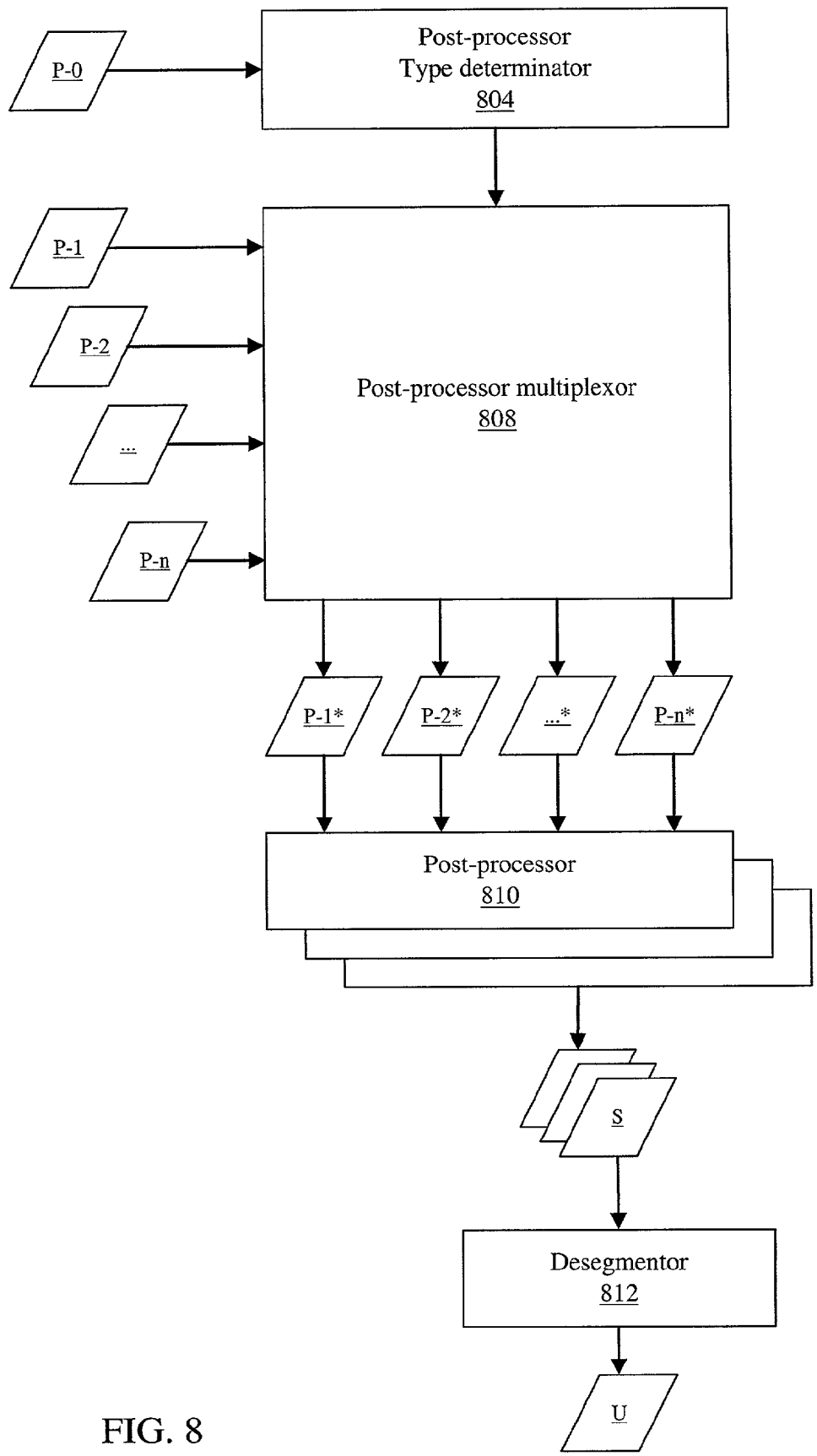
FIG. 8 is a block diagram illustrating an individual post-processing step used to enhance the efficiency of existing differencing methods which is suitable for implementing various embodiments.

FIG. 8: Individual Post-processing Step

FIG. 8 is a block diagram of an embodiment of an individual post-processing step. This individual post-processing step may invert the transformations made by the matching pre-processor step described in FIG. 5.

Post-processor type determination module 804 may interpret the type information recorded in data stream $P_0$ and may use this type information to instruct the post-processor multiplexor 808 to select the post-processor module 810 which corresponds to the pre-processor module 510 selected during difference representation construction (see FIG. 5). The post-processor modules 810 may implement methods which invert the transformations of the corresponding pre-processor modules 510 used during construction of data streams $P_1 \ldots P_n$, resulting in the sequence of substream segments (S). The desegmentor module 812 may then use the sequence of substream segments (S) to reassemble the original incoming data stream (U).

Post-processor example #1 (database record parsing) may reassemble data stream (U) by reading one record from $P_1$ and one from $P_2$ and then inserting the price information from the $P_2$ record into the $P_1$ record following the goods details information. Similarly, post-processor example #2 (decompression of compressed data) may compress the uncompressed stream, $P_1$, back into ZIP format (U). A particular post-processing method for use with executable content is described in FIG. 13.

Figure 9:
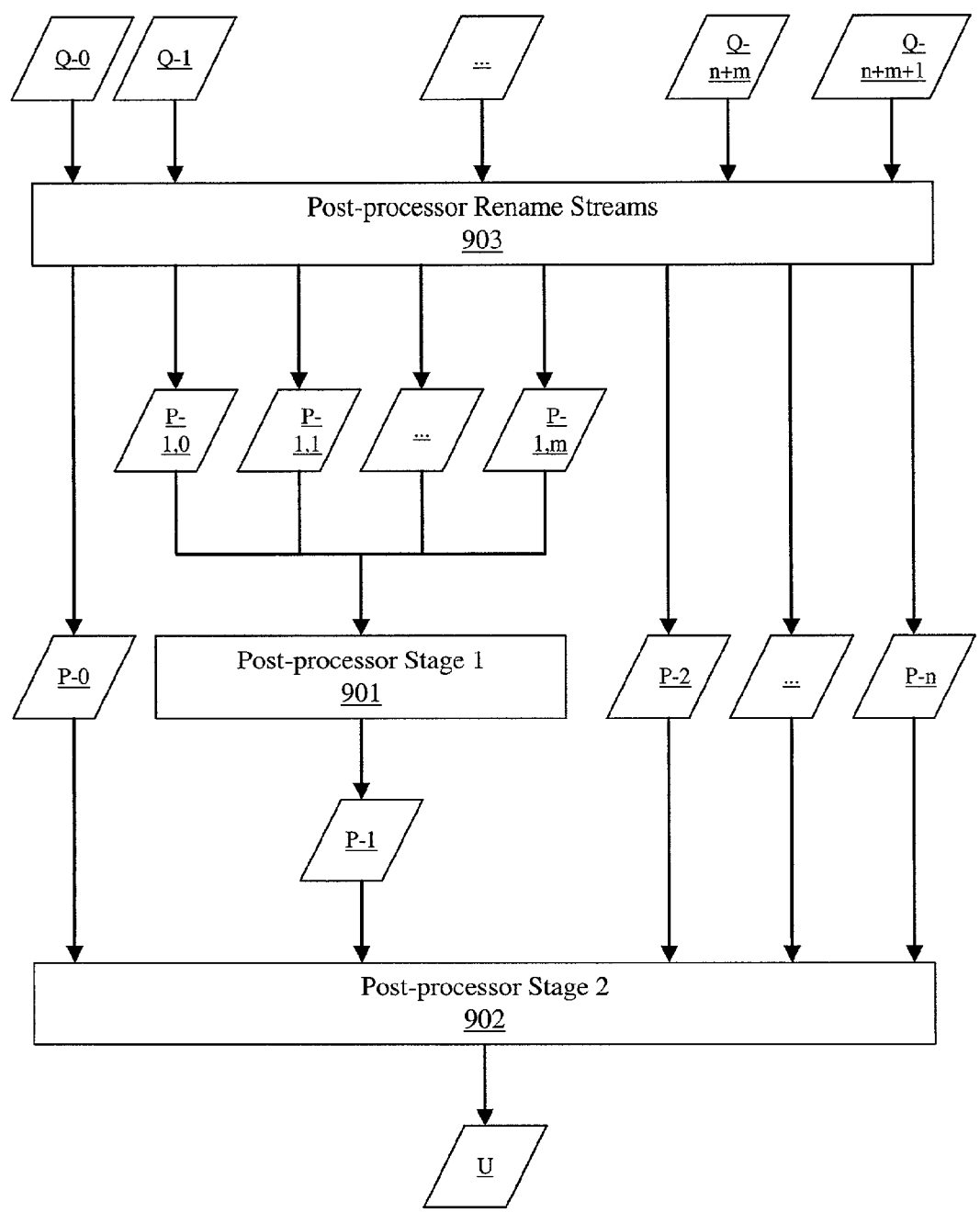
FIG. 9 is a block diagram illustrating multiple post-processing steps which may be combined to form a single composite post-processing step of the same general form which is suitable for implementing various embodiments.

FIG. 9: Composite Post-processing Step

FIG. 9 is a block diagram of an embodiment of a composite post-processing step. The composite post-processing step in this example is made up of three stages: a post-processor rename streams stage (903), a post-processor stage 1 (901), and a post-processor stage 2 (902). This composite post-processing step may invert the transformations made by the matching pre-processor step described in FIG. 6.

The transformed data streams $Q_0 \ldots Q_{n+m+1}$ may be processed by the post-processor rename streams stage (903), resulting in transformed data streams $P_0, P_{1,0} \ldots P_{1,m}, P_2 \ldots P_n$. The post-processor stage 1 (901) is shown as acting upon transformed data streams $P_{1,0} \ldots P_{1,m}$ only. It is noted that the post-processor stage 1 (901) may just as easily act upon any or all of the transformed data streams $P_0, P_2 \ldots P_n$ output from the post-processor rename streams stage (903). Additional post-processor stages (i.e., a post-processor stage 3, a post-processor stage 4, etc.) may also be added in any instantiation or embodiment. Each additional post-processor stage may act upon any or all of the transformed data streams of previous post-processor stages. Similarly, further stages may be composited onto the resulting combined stage to an arbitrary degree. For any given instantiation the composition architecture (i.e., the number of stages on any given path) will normally be fixed. Consequently the number and semantics of the output streams may be fixed and deterministic for any given implementation. The input to the post-processor stage 2 (902) may be transformed data streams $P_0, P_2 \ldots P_n$, directly from the post-processor rename streams stage (903), along with transformed data stream $P_1$, directly from the postprocessor stage 1 (901). It is noted that transformed data streams $P_{1,0} \ldots P_{1,m}$ are not inputs to the post-processor stage 2 (902). The processing performed by the post-processor stage 2 (902) upon transformed data streams $P_0 \ldots P_n$ may result in the original form of the updated version of the data (U).

Figure 10:
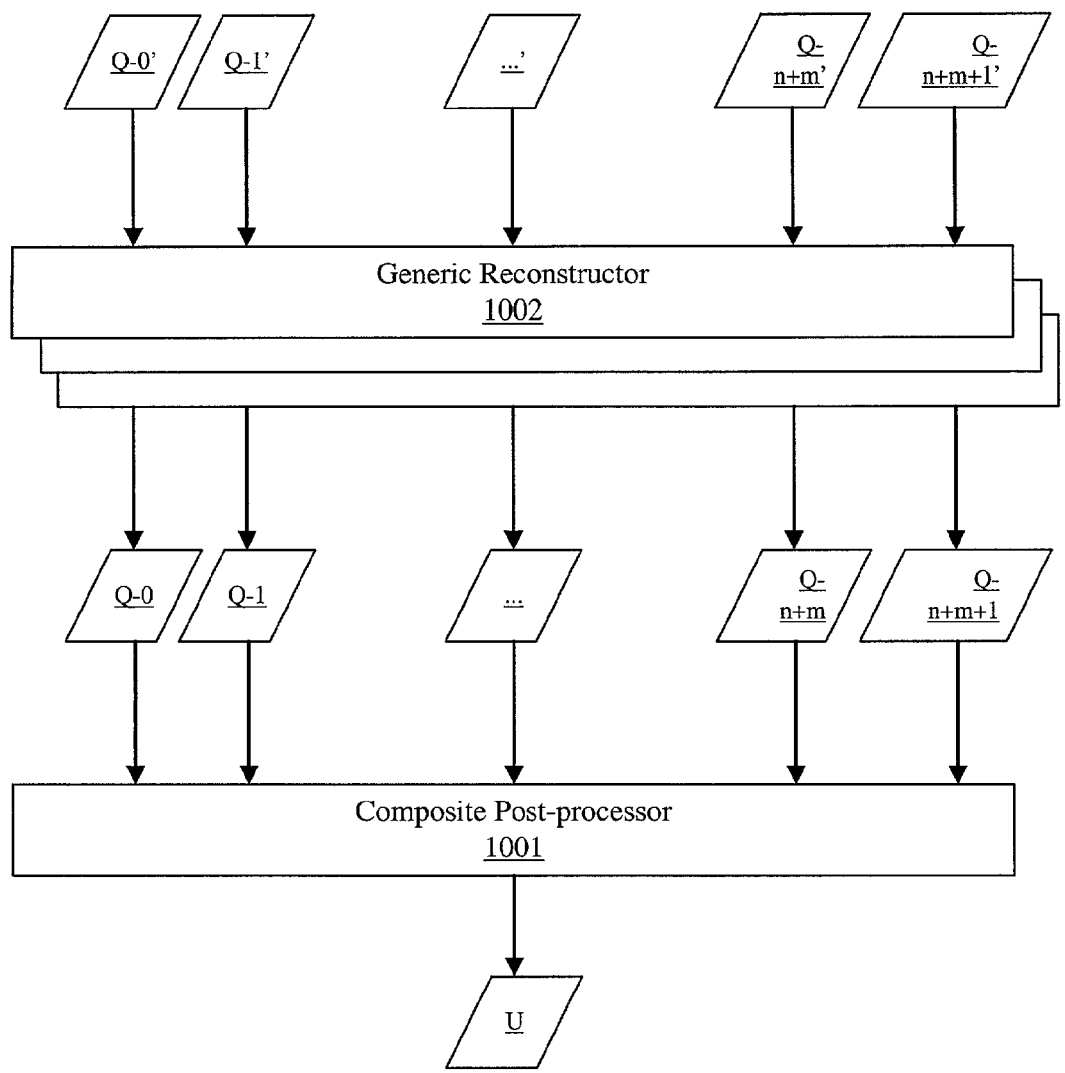
FIG. 10 is a block diagram illustrating a combined post-processing step used in conjunction with the reconstruction steps of known differencing methods to produce an enhanced reconstructor which is suitable for implementing various embodiments.

FIG. 10: Enhanced Reconstructor

FIG. 10 is a block diagram of an embodiment of a composite post-processing step (i.e., as described in FIG. 9) combined with generic reconstructors associated with the known differencing methods of FIG. 7 to produce an enhanced reconstructor. The composite post-processing steps of FIG. 9 are noted as one step in this example: a composite post-processor 1001. This process, described in FIG. 10, may invert the process described in FIG. 7, thus converting the $Q_i'$ data streams back to the original form of the updated version of the data (U).

The transformed data streams $Q_0' \ldots Q_{n+m+1}'$ may be subject to reconstructing using any known generic reconstructing method 1002, resulting in transformed data streams $Q_0 \ldots Q_{n+m+1}$. As discussed earlier, the known generic reconstructing method 1002 may compare the previous version of the data streams with the current transformed data streams $Q_0' \ldots Q_{n+m+1}'$. Each output stream $Q_0 \ldots Q_{n+m+1}'$ may then be passed to the composite post-processor 1001, resulting in the original form of the updated version of the data (U). It is noted that it is not necessary to use the same known generic reconstructing method in box 1002 on each output data stream $Q_i'$ provided that there is a deterministic mapping of differencing method to output data stream to allow reassembling. Typical embodiments may use an identity reconstructor in box 1002 upon data stream $Q_0'$ along with other reconstructors upon the other data streams. The identity reconstructor ignores the previous version of the data entirely and simply outputs the updated data in full, such that $Q_i' = Q_i$.

Figure 11:
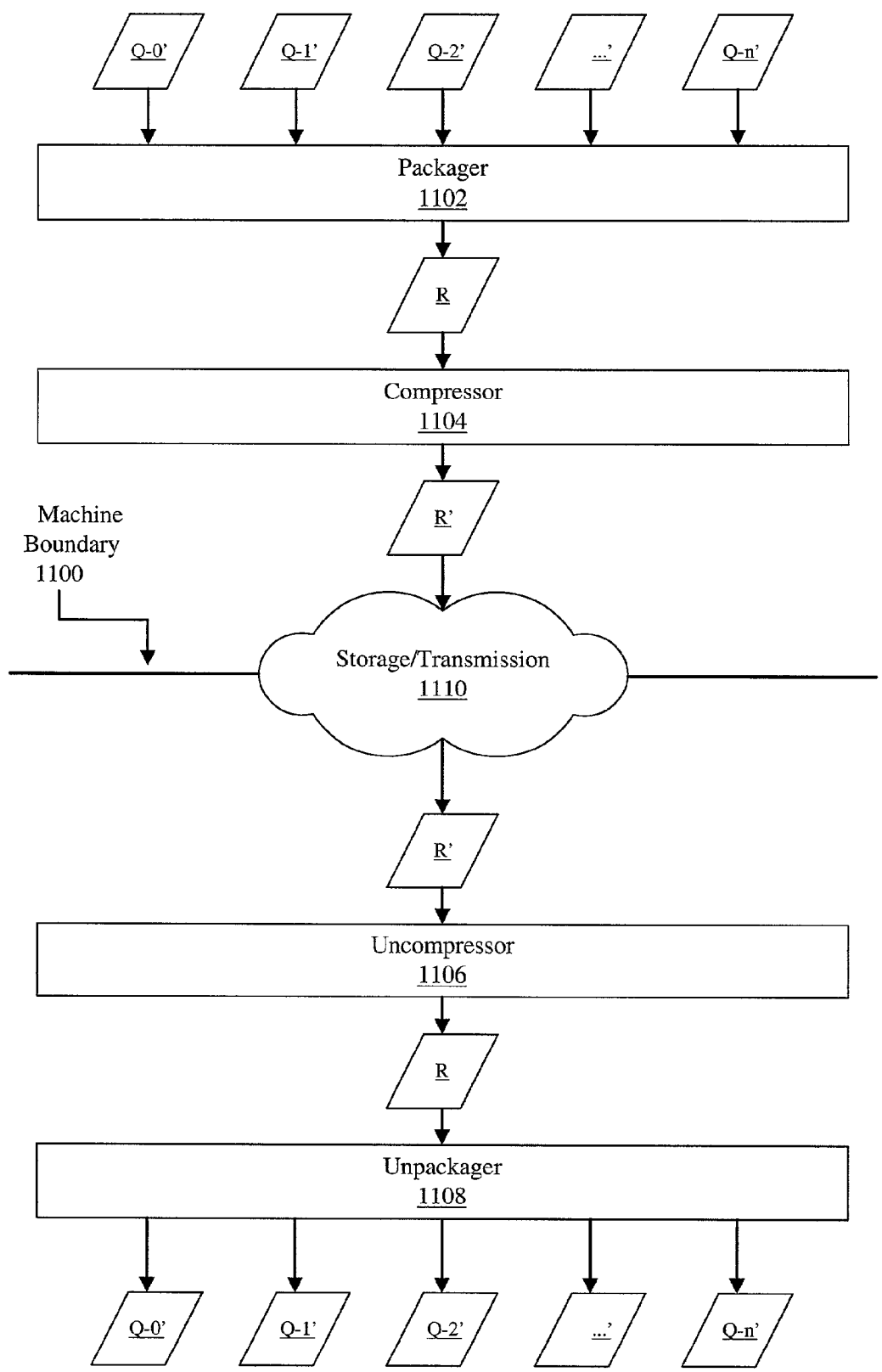
FIG. 11 is a block diagram illustrating packaging and unpackaging processes used to facilitate transmission or storage of the difference representations which is suitable for implementing various embodiments.

FIG. 11: Packaging and Unpackaging Processes

FIG. 11 is a block diagram illustrating an embodiment of a packaging process and an unpackaging process which may be used to facilitate transmission or storage of the difference representations, $Q_0' \ldots Q_n'$.

The individual data streams $Q_0' \ldots Q_n'$ may be packaged into a single data stream (R) by a known method (e.g., length-encoded concatenation) by a packaging module 1102. In one embodiment, the single data stream (R) may then be compressed by a known compression method (e.g., ZIP) by a compressor module 1104. The resulting data stream (R') may then be stored or transmitted by means of a computer network 1110. This process facilitates efficient transmission and storage of difference representations.

When (or where) the original form of the updated version of the data (U) is to be reconstructed an inverse process may proceed as follows: an uncompressor module 1106 may use a known decompression method associated with the known compression method used by the compressor module 1104 to decompress the data stream (R') to reconstruct the single data stream (R). An unpackaging module 1108 may then split the single data stream (R) into individual data streams $Q_0' \ldots Q_n'$ by inverting the known method employed by the packaging module 1102. The individual data streams $Q_0'$ may then be used as input to the reconstruction process described in FIG. 10.

Figure 12:
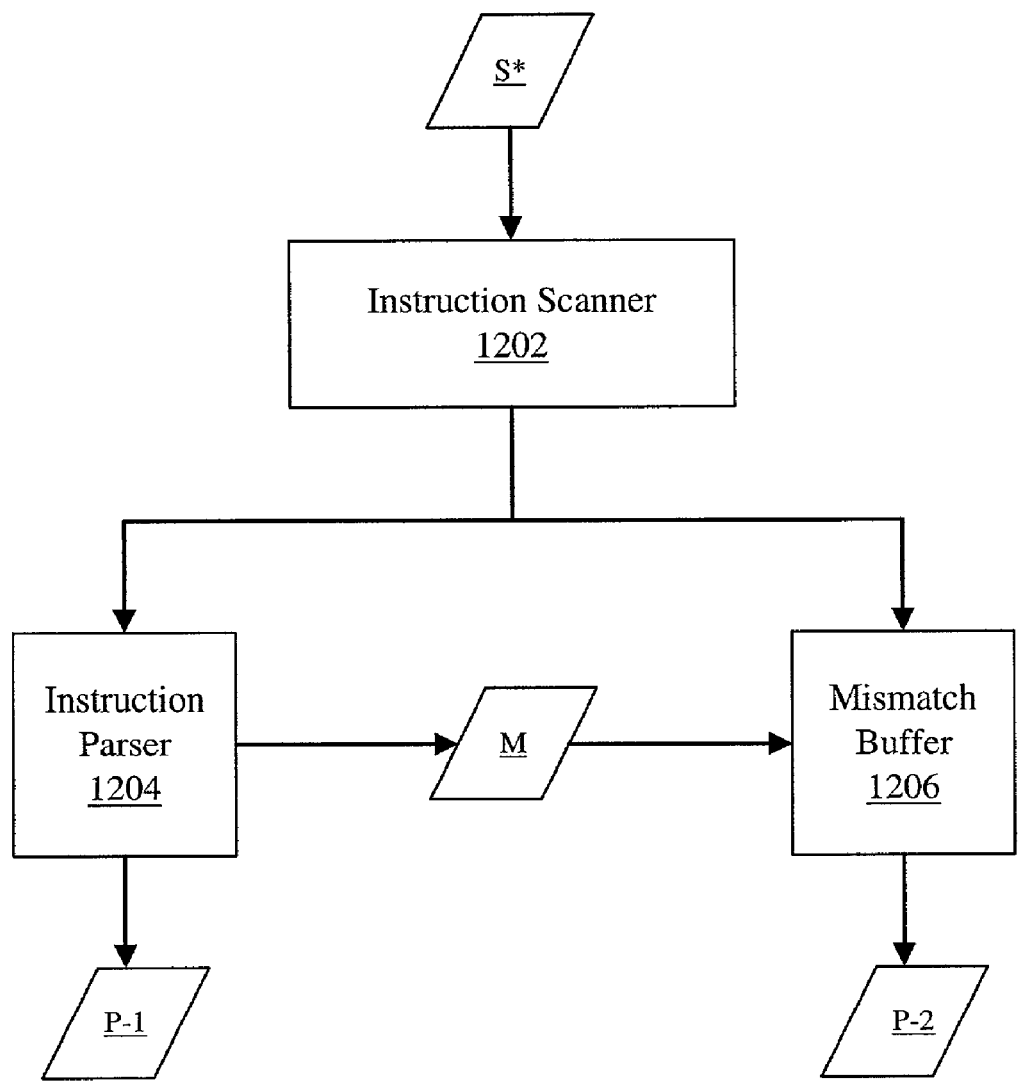
FIG. 12 is a block diagram illustrating a pre-processor specifically intended to handle executable format data according to one embodiment.

FIG. 12: Executable Format Example: Pre-processor

FIG. 12 is a block diagram illustrating an embodiment of a pre-processor specifically intended to enhance the differencing process for executable format data (e.g., Wintel program files).

The function of the pre-processor is to separate the volatile elements of the incoming data stream (e.g., linkage offsets and variable addresses that are likely to change when otherwise localized changes are made to the source file; when the source file is "built" (i.e., compiled), the output of the build process is the executable in question) from the non-volatile elements (e.g., the pattern of instructions that make up the code in the source file, stripped of the target address components).

Instruction scanner 1202 may buffer the input data stream (S*) and may scan the input data stream (S*) for data representing sequences of instructions in the associated format. Examples of formats include: Intel machine instruction sequences in the case of a Wintel executable file, Java bytecode, as well as other physical machine architectures, and other virtual machine architectures. Sequences that the instruction scanner 1202 determines do not represent instruction sequences may be output to the pattern mismatch buffer 1206. The instruction scanner 1202 may output identified instruction sequences to the instruction parser 1204, together with control information relating the provided instruction sequence to its start position within the input data stream (S*). The symbol for the "end of input" may be treated as a zero-length instruction sequence and processed by the instruction parser 1204 accordingly. This process may ensure correct flushing of the output stream via the processes that the instruction parser 1204 goes through when processing an instruction sequence.

Instruction parser 1204 may parse each instruction in the sequence in turn. For each possible instruction within the instruction code of the targeted machine architecture (e.g., Intel x86 or its descendants) a pattern template may determine which bytes comprising the instruction are to be considered "volatile" and which are to be considered "non-volatile". In one embodiment, op-codes, op-code modifiers, and immediate operands may be considered "non-volatile" while address operands or offset operands (e.g., absolute addresses, relative offsets, jump targets, branch relative offsets) may be considered "volatile". For example, the instruction:

MOV EAX, [DWORD <address>] is represented by the byte sequence:

8B 05 XX XX XX XX where XX XX XX XX is the hex encoding of <address>.

The pattern template for this instruction may be:

N N V V V V where N indicates a non-volatile byte and V a volatile byte.

The instruction parser 1204 may then output the non-volatile bytes on the pattern data stream $P_1$ and the volatile bytes on the mismatch data stream M. It is noted that the mismatch data stream M passes through the mismatch buffer 1206 to the mismatch data stream $P_2$, as described below.

The instruction parser 1204 may also emit a pseudo op-code demarking the boundary between non-contiguous (in the input stream) instruction sequences. This pseudo op-code may be emitted prior to the start of the second instruction sequence (of the two under consideration). It is noted that the pseudo op-code may be drawn from the set of illegal op-codes for the target machine architecture, so as to make it distinguishable from other legal op-code sequences that may occur in the pattern stream. When generating this pseudo op-code the instruction parser 1204 may also instruct the mismatch buffer 1206 to flush its buffered non-instruction sequence (if any) preceded by the length of that non-instruction sequence (i.e., a length encoded sequence) on the mismatch data stream $P_2$. If there is no such buffered non-instruction data, then no output may be appended to the mismatch data stream $P_2$. That is, a length-encoding of 0 may not be emitted if there is no buffered non-instruction data present.

One function of the mismatch buffer 1206 may be to ensure the correct interleaving of non-instruction data and instruction data. This function may be accomplished by the mismatch buffer 1206 responding to flush requests from the instruction parser 1204, as described above. In particular, the mismatch buffer 1206 may buffer all non-instruction data up until the start of the following instruction sequence is identified (or end of input occurs). At this point, the mismatch buffer 1206 may interleave data as follows: (1) any buffered non-instruction data in length-encoded form (i.e., the mismatch data stream M) and (2) instruction data passed to the mismatch buffer 1204 for the identified sequence by the instruction parser 1204. This interleaving may guarantee that the length of any non-instruction sequence precedes that non-instruction sequence section and may allow the start of the following instruction information to be identified.

One constraint that may be placed on the instruction parser 1204 is that all bytes necessary to determine the form of the instruction (e.g., op-code and some op-code modifiers for the Intel x86 instruction set) are considered non-volatile. This constraint may ensure that the non-volatile bytes for a particular instruction, which are known as the instruction pattern, may uniquely identify a particular instruction pattern template.

Together the pseudo op-code interleaving and the constraint described above may ensure that the pattern data stream $P_1$ is able to be parsed by an inverting post-processor (shown in FIG. 13) in a deterministic fashion, drawing on the mismatch buffer 1206 only in response to the parsing of the pattern data stream $P_1$.

Figure 13:
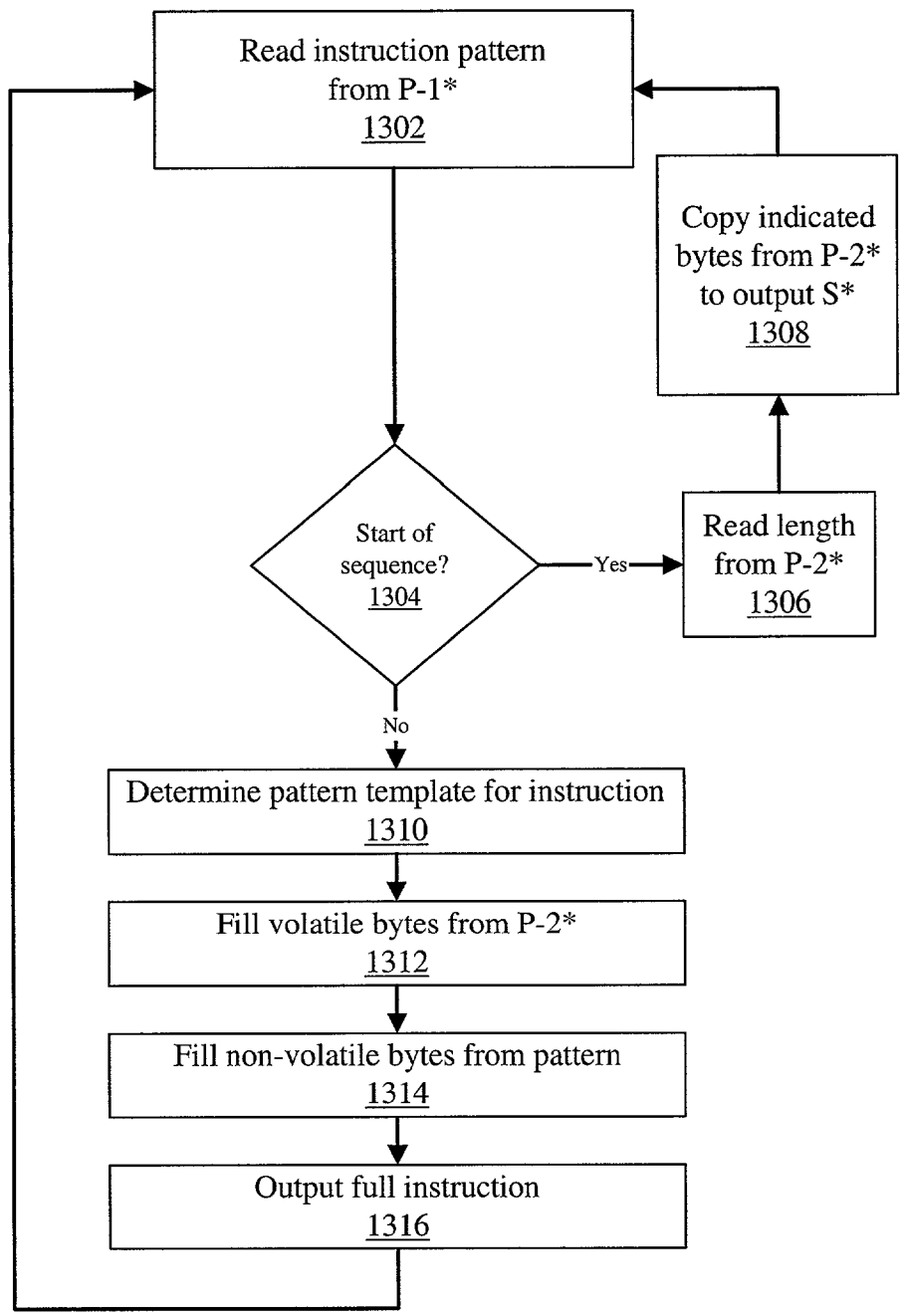
FIG. 13 is a flowchart illustrating a post-processor specifically intended to handle executable format data according to one embodiment.

FIG. 13: Executable Format Example: Post-processor

FIG. 13 is a flowchart illustrating an embodiment of a post-processor corresponding to the pre-processor of FIG. 12.

In step 1302, bytes may be consumed from the pattern data stream $P_1$* until a complete instruction pattern has been read. In step 1304, this instruction pattern may be compared against the pattern for the start-of-sequence pseudo-instruction. If the instruction pattern is the start-of-sequence pseudo-instruction, then step 1306 may be processed; otherwise, step 1310 may be processed. In step 1306, the length of the preceding non-instruction sequence may be read from the mismatch data stream $P_2$*. In step 1308, the number of bytes indicated by the length (read in step 1306) may then be consumed from the mismatch data stream $P_2$* and these bytes may then be output to the output data stream (S*). Following step 1308, processing may loop back to step 1302, where another instruction pattern may be read.

In step 1310, the instruction pattern template corresponding to the instruction pattern may be determined. In step 1312, the volatile bytes in the instruction pattern template may then be filled in by reading bytes from the mismatch data stream $P_2$*. In step 1314, the non-volatile bytes from the instruction pattern template may then be read from the instruction pattern template. In step 1316, the resulting complete instruction may then be emitted on the output data stream (S*). Following step 1316, processing may loop back to step 1302, where another instruction pattern may be read.

One benefit of this process is that, as mentioned earlier, non-localized changes in the input data stream may be localized in the output data streams. In the example described in FIGS. 12 and 13, almost all change is confined to the mismatch data stream. This localization of changes may result in very efficient differencing of the pattern stream and therefore improved overall differencing efficiency.

Another benefit of this process is that by removing the vagaries of the particular operands being used in higher level programming structures (e.g., subroutine entry, looping control structures, etc.) in the pattern stream, recurring sequences that correspond to compiler idioms for these higher-level structures may emerge. Because these sequences recur frequently, additional compression may be achieved when the resulting stream is later compressed with known compression algorithms (e.g., in the packaging process described in FIG. 11). Combining efficient data difference representation with compression (i.e., differencing against NULL, as previously mentioned), may significantly increase the effectiveness of the known compression mechanism on executable data types.

Although the system and method of the present invention have been described in connection with several embodiments, the invention is not intended to be limited to the specific forms set forth herein, but on the contrary, it is intended to cover such alternatives, modifications, and equivalents as may be reasonably included within the spirit and scope of the invention as defined by the appended claims.

What is claimed is:

1. A method of reducing a size of data difference representations, the method comprising:

identifying an original version of an input data stream in an original form;

dividing the original form of the original version of the input data stream into separate original version output data streams through the use of a pre-processor;
identifying an updated version of the input data stream in the original form;
dividing the original form of the updated version of the input data stream into separate updated version output data streams through the use of the pre-processor; and
differencing at least two of the separate updated version output data streams with a corresponding separate original version output data stream to produce data difference representations.

2. The method of claim 1, wherein the data difference representations are smaller than a data difference representation created by differencing the original form of the updated version of the input data stream with the original form of the original input data stream.

3. The method of claim 1, further comprising:
reconstructing the separate updated version output data streams from the data difference representations and the original version output data streams; and
combining the separate updated version output data streams into the original form of the updated version of the input data stream through the use of a post-processor.

4. The method of claim 1 wherein the original form of the original version of the input data stream is empty.

5. The method of claim 1 wherein the pre-processor comprises decompression algorithms.

6. The method of claim 1 wherein the dividing separates volatile components of the input data stream from less volatile components of the input data stream.

7. The method of claim 6 wherein the input data stream is executable code.

8. The method of claim 7 wherein the volatile components comprise branch targets.

9. The method of claim 7 wherein the volatile components comprise data addresses.

10. The method of claim 7 wherein the less volatile components comprise instruction code.

11. The method of claim 7 wherein the less volatile components comprise immediate data.

12. The method of claim 6, wherein the volatile components are substantially dynamically changing components and wherein the less volatile components are substantially static components.

13. The method of claim 1, further comprising:
packaging the data difference representations into a single data stream;
compressing the single data stream; and
storing the single data stream.

14. The method of claim 13, further comprising:
transmitting the single data stream;
uncompressing the single data stream; and
unpackaging the single data stream into the data difference representations.

15. The method of claim 1, wherein dividing the original form of the updated version of the input data stream into separate updated version output data streams includes parsing the input data stream according to a data type of the input data stream.

16. The method of claim 1, wherein differencing at least two of the separate updated version output data streams with a corresponding separate original version output data stream to produce data difference representations comprises differencing each of the separate updated version output data streams with a corresponding separate original version output data stream to produce data difference representations.

17. The method of claim 1,
wherein the dividing separates first components of the input data stream from second components of the input data stream, and
wherein the first components are components of the input data stream that are statistically more likely to have changed between the original version of the input data stream and the updated version of the input data stream than the second components.

18. The method of claim 17, wherein a pattern template is used to separate the first components and the second components.

19. A system of reducing a size of data difference representations, the system compnsing:
a network;
a first computer system coupled to the network;
a system memory coupled to the first computer system, wherein the system memory stores one or more computer programs executable by the first computer system;
wherein the computer programs are executable to:
identify an original version of an input data stream in an original form;
divide the original form of the original version of the input data stream into separate original version output data streams through the use of a pre-processor;
identify an updated version of the input data stream in the original form;
divide the original form of the updated version of the input data stream into separate updated version output data streams through the use of the pre-processor; and
difference at least two of the separate updated version output data streams with a corresponding separate original version output data stream to produce data difference representations.

20. The system of claim 19, wherein the data difference representations are smaller than a data difference representation created by differencing the original form of the updated version of the input data stream with the original form of the original input data stream.

21. The system of claim 19, further comprising:
a second computer system coupled to the network;
a system memory coupled to the second computer system, wherein the system memory stores one or more computer programs executable by the second computer system;
wherein the pre-processor is located in the first computer system; and
wherein the post-processor is located in the second computer system.

22. The system of claim 21, wherein the computer programs are further executable to:
reconstruct the separate updated version output data streams from the data difference representations and the original version output data streams; and
combine the separate updated version output data streams into the original form of the updated version of the input data stream through the use of a post-processor.

23. The system of claim 21 wherein the original form of the original version of the input data stream is empty.

24. The system of claim 21 wherein the pre-processor comprises decompression algonthms.

25. The system of claim 21 wherein the dividing separates volatile components of the input data stream from less volatile components of the input data stream.

26. The system of claim 25 wherein the input data stream is executable code.

27. The system of claim 26 wherein the volatile components comprise branch targets.

28. The system of claim 26 wherein the volatile components comprise data addresses.

29. The system of claim 26 wherein the less volatile components comprise instruction code.

30. The system of claim 26 wherein the less volatile components comprise immediate data.

31. The system of claim 21, wherein the computer programs are further executable to:
package the data difference representations into a single data stream;
compress the single data stream; and
store the single data stream on a memory medium coupled to the first computer system.

32. The system of claim 31, wherein the computer programs are further executable to:
transmit the single data stream from the memory medium coupled to the first computer system to a second computer system over a computer system network;
uncompress the single data stream; and
unpackage the single data stream into the data difference representations.

33. The system of claim 19, wherein dividing the original form of the updated version of the input data stream into separate updated version output data streams includes parsing the input data stream according to a data type of the input data stream.

34. A carrier medium which stores program instructions, wherein the program instructions are executable to implement reducing a size of data difference representations comprising:
identifying an original version of an input data stream in an original form;
dividing the original form of the original version of the input data stream into separate original version output data streams through the use of a pre-processor;
identifying an updated version of the input data stream in the original form;
dividing the original form of the updated version of the input data stream into separate updated version output data streams through the use of the pre-processor; and
differencing at least two of the separate updated version output data streams with a corresponding separate original version output data stream to produce data difference representations.

35. The carrier medium of claim 34, wherein the data difference representations are smaller than a data difference representation created by differencing the original form of the updated version of the input data stream with the original form of the original input data stream.

36. The carrier medium of claim 34, wherein the program instructions are further executable to implement:
reconstructing the separate updated version output data streams from the data difference representations and the original version output data streams; and
combining the separate updated version output data streams into the original form of the updated version of the input data stream through the use of a post-processor.

37. The carrier medium of claim 34 wherein the original form of the original version of the input data stream is empty.

38. The carrier medium of claim 34 wherein the pre-processor comprises decompression algorithms.

39. The carrier medium of claim 34 wherein the dividing separates volatile components of the input data stream from less volatile components of the input data stream.

40. The carrier medium of claim 39 wherein the input data stream is executable code.

41. The carrier medium of claim 40 wherein the volatile components comprise branch targets.

42. The carrier medium of claim 40 wherein the volatile components comprise data addresses.

43. The carrier medium of claim 40 wherein the less volatile components comprise instruction code.

44. The carrier medium of claim 40 wherein the less volatile components comprise immediate data.

45. The carrier medium of claim 34, wherein the program instructions are further executable to implement:
packaging the data difference representations into a single data stream;
compressing the single data stream; and
storing the single data stream on a memory medium coupled to a first computer system.

46. The carrier medium of claim 45, wherein the program instructions are further executable to implement:
transmitting the single data stream from the memory medium coupled to the first computer system to a second computer system over a computer system network;
uncompressing the single data stream; and
unpackaging the single data stream into the data difference representations.

47. The carrier medium of claim 34, wherein the carrier medium is a memory medium.

48. The carrier medium of claim 34, wherein dividing the original form of the updated version of the input data stream into separate updated version output data streams includes parsing the input data stream according to a data type of the input data stream.

* * * * *